(12) United States Patent
Kim et al.

(10) Patent No.: US 9,565,374 B2
(45) Date of Patent: Feb. 7, 2017

(54) SAMPLING PERIOD CONTROL CIRCUIT CAPABLE OF CONTROLLING SAMPLING PERIOD

(71) Applicant: Samsung Electronics Co., Ltd., Suwon-Si, Gyeonggi-Do (KR)

(72) Inventors: Tae-Chan Kim, Yongin-si (KR); Gab-Soo Han, Seoul (KR); Dong-Ki Min, Seoul (KR); Jung-Hoon Jung, Hwaseong-si (KR)

(73) Assignee: Samsung Electronics Co., Ltd., Gyeonggi-Do (KR)

(\*) Notice: Subject to any disclaimer, the term of this patent is extended or adjusted under 35 U.S.C. 154(b) by 0 days.

(21) Appl. No.: 14/632,418

(22) Filed: Feb. 26, 2015

(65) Prior Publication Data

US 2015/0263710 A1    Sep. 17, 2015

(30) Foreign Application Priority Data

Mar. 14, 2014 (KR) .......................... 10-2014-0030477

(51) Int. Cl.
| | | |
|---|---|---|
| H04N 5/355 | (2011.01) | |
| H04N 5/353 | (2011.01) | |
| H04N 5/357 | (2011.01) | |
| H04N 5/3745 | (2011.01) | |
| H04N 5/378 | (2011.01) | |

(52) U.S. Cl.
CPC ............ H04N 5/353 (2013.01); H04N 5/3575 (2013.01); H04N 5/35518 (2013.01); H04N 5/378 (2013.01); H04N 5/37455 (2013.01)

(58) Field of Classification Search
CPC .......... H04N 5/155; H04N 5/33; H04N 5/378; H04N 5/37455; H04N 5/355; H04N 5/374
USPC .................... 327/100, 156, 306, 539, 540
See application file for complete search history.

(56) References Cited

U.S. PATENT DOCUMENTS

| | | |
|---|---|---|
| 6,646,246 B1 | 11/2003 | Gindele et al. |
| 2009/0274387 A1 | 11/2009 | Jin |
| 2010/0128149 A1* | 5/2010 | Kim ............... H04N 5/3575 348/242 |
| 2011/0211732 A1 | 9/2011 | Rapaport |
| 2011/0254976 A1 | 10/2011 | Garten |
| 2012/0195502 A1 | 8/2012 | Wang et al. |
| 2012/0288217 A1 | 11/2012 | Zhai et al. |

FOREIGN PATENT DOCUMENTS

JP    2012-134666 A    7/2012

\* cited by examiner

*Primary Examiner* — John Poos
(74) *Attorney, Agent, or Firm* — Harness, Dickey & Pierce, P.L.C.

(57) ABSTRACT

A sampling period control circuit according to an example embodiment of the inventive concepts is configured to derive a ramp voltage range of a row signal when analyzing a previous row signal in order to control a ramp voltage range of a next row signal.

15 Claims, 6 Drawing Sheets

| PD | | | |
|---|---|---|---|
| | | | |
| | | | |
| | | | S |

| 4S | |
|---|---|
| | | ved with a subsequent process.
SAMPLING PERIOD CONTROL CIRCUIT CAPABLE OF CONTROLLING SAMPLING PERIOD

CROSS-REFERENCE TO RELATED APPLICATION

This application claims priority under 35 U.S.C. §119 to Korean Patent Application No. 10-2014-0030477 filed on Mar. 14, 2014, the disclosure of which is hereby incorporated by reference in its entirety.

BACKGROUND

Field

At least one example embodiment of the inventive concepts relates to image sensors, and more specifically, to image sensors that control a ramp period using a sampled signal.

Description of Related Art

Main components of a normal image sensor include a pixel array having a matrix structure formed of a plurality of columns and rows, and a converter for converting an output from the pixel array. When the pixel array detects an optical image and outputs a result as an analog voltage, the converter converts the detected analog voltage to a digital value and proceeds with a subsequent process.

The performance of an image sensor depends on how well the process of converting the analog voltage supplied from the pixel array to the digital value is performed.

SUMMARY

At least one example embodiment of the inventive concepts provides a sampling period control circuit for controlling a sampling period by analyzing a previous row signal to set a new ramp voltage range.

Technical objectives of the inventive concepts are not limited to those described with respect to example embodiment; other objectives may become apparent to those of ordinary skill in the art based on the following descriptions.

In accordance with an aspect of the inventive concepts, a sampling period control circuit is configured to derive a ramp voltage range of a row signal when analyzing a previous row signal in order to control a ramp voltage range of a next row signal.

In at least one example embodiment, the sampling period control circuit may include a row range detector configured to detect a substantial maximum value and minimum value of a row scanning range by analyzing the previous row signal. The sampling period control circuit may include a row range controller configured to reset a scan ramp maximum value and a scan ramp minimum value based on an error range in the substantial maximum value and minimum value of the row scanning range. The sampling period control circuit may include a ramp controller configured to control scanning and comparing a ramp voltage of a corresponding row using the scan ramp maximum value and the scan ramp minimum value. The sampling period control circuit may include a correlated double sampling (CDS) circuit configured to perform CDS operation on a result of the comparison received from the ramp controller.

In at least one example embodiment, the row range detector may be configured to detect the substantial maximum value and minimum value of the row scanning range from data fed back from the CDS circuit, the data relating to the previous row signal.

In at least one example embodiment, the row range controller may be configured to select a higher value between a minimum value of a preset ramp scanning range and a minimum value of a scanning range measured in the previous row signal as the scan ramp minimum value.

In at least one example embodiment, the row range controller may be configured to select a lower value between a maximum value of the preset ramp scanning range and a maximum value of a scanning range measured in the previous row signal as the scan ramp maximum value.

In at least one example embodiment, the row range controller may be configured to detect an error range to obtain the scan ramp minimum value.

In at least one example embodiment, the row range controller may be configured to add the error range to obtain the scan ramp maximum value.

In at least one example embodiment, a level compensator may be configured to adjust a count value read from each column in response to an output of the row range controller and the CDS circuit based on an original count value.

In accordance with another aspect of the inventive concepts, a sampling period control circuit is configured to control a ramp voltage scanning range and a sampling period of a previous row signal to be different from a ramp voltage scanning range and a sampling period of a next row signal.

In at least one example embodiment, the sampling period control circuit may include a row range detector configured to detect a substantial maximum value and minimum value of a row scanning range by analyzing the previous row signal. The sampling period control circuit may include a row range controller configured to reset a scan ramp maximum value and a scan ramp minimum value based on an error range in the substantial maximum value and minimum value of the row scanning range. The sampling period control circuit may include a ramp controller configured to control scanning and comparing a ramp voltage of a corresponding row using the scan ramp maximum value and the scan ramp minimum value. The sampling period control circuit may include a CDS circuit configured to perform CDS operation on a result of comparison received from the ramp controller.

In at least one example embodiment, the row range detector may be configured to detect the substantial maximum value and minimum value of the row scanning range from data fed back from the CDS circuit, the data relating to the previous row signal.

In at least one example embodiment, the row range controller may be configured to select a higher value between a minimum value of a preset ramp scanning range and a minimum value of a scanning range measured in the previous row as the scan ramp minimum value.

In at least one example embodiment, the row range controller may be configured to select a lower value between a maximum value of the preset ramp scanning range and a maximum value of a scanning range measured in the previous row signal as the scan ramp maximum value.

In at least one example embodiment, the ramp voltage scanning range of the next row signal may be less than the ramp voltage scanning range of the previous row signal.

In at least one example embodiment, the sampling period of the next row signal may be shorter than the sampling period of the previous row signal.

In at least one example embodiment, a device includes a sampling period control circuit configured to measure a voltage range of a first scan signal, and adjust a voltage range of a second scan signal based on the measured voltage range, the second scan signal being subsequent to the first scan signal.

In at least one example embodiment, the sampling period control circuit is configured to adjust the voltage range of the second scan signal is based on the measured voltage range and an error range associated with the measured voltage range of the first scan signal.

In at least one example embodiment, the sampling period control circuit is configured to perform a sampling operation using the second scan signal having the adjusted voltage range.

In at least one example embodiment, the sampling period control circuit is configured to select a higher value between a minimum value of a preset voltage range and a minimum value of the measured voltage range as a minimum value of the adjusted voltage range.

In at least one example embodiment, the sampling period control circuit is configured to select a lower value between a maximum value of a preset voltage range and a maximum value of the measured voltage range as a maximum value of the adjusted voltage range.

Details of other example embodiments are included in the detailed description and drawings.

BRIEF DESCRIPTION OF THE DRAWINGS

The above and other objects and features will become apparent from the following description with reference to the following figures, wherein like reference numerals refer to like parts throughout the various figures unless otherwise specified, and wherein:

FIG. 1A is a schematic block diagram showing a pixel array;

FIG. 1B is a block diagram showing a pixel array in which a desired (or alternatively, predetermined) number of pixels are grouped;

DETAILED DESCRIPTION OF EXAMPLE EMBODIMENTS

Figure 2:
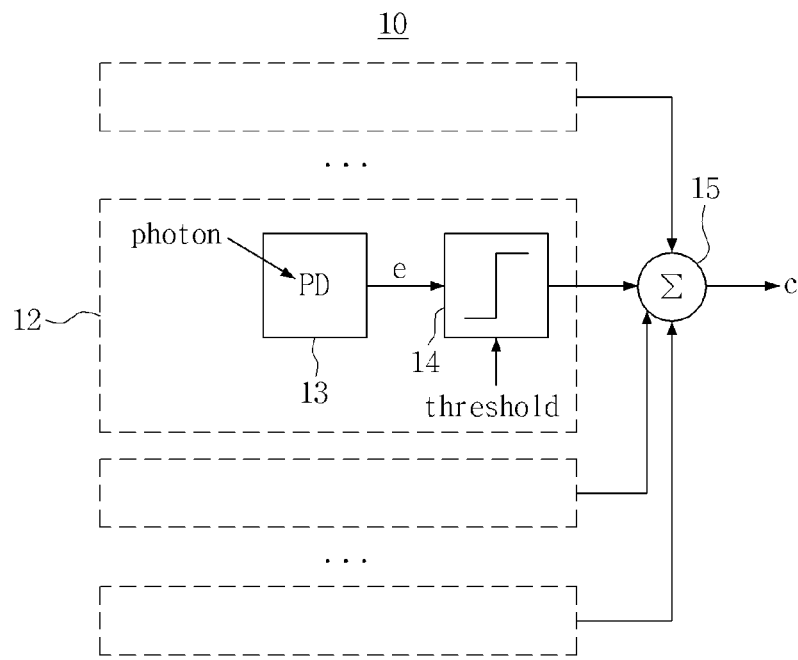
FIG. 2 is a block diagram showing an image sensor including a pixel using a binary sensor.

Inventive concepts will now be described more fully with reference to the accompanying drawings, in which example embodiments of are shown. These example embodiments are provided so that this disclosure will be thorough and complete, and will fully convey inventive concepts of to those skilled in the art. Inventive concepts may be embodied in many different forms with a variety of modifications, and a few embodiments will be illustrated in drawings and explained in detail. However, this should not be construed as being limited to example embodiments set forth herein, and rather, it should be understood that changes may be made in these example embodiments without departing from the principles and spirit of inventive concepts, the scope of which are defined in the claims and their equivalents. Like numbers refer to like elements throughout. In the drawings, the thicknesses of layers and regions are exaggerated for clarity.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Specific details are provided in the following description to provide a thorough understanding of example embodiments. However, it will be understood by one of ordinary skill in the art that example embodiments may be practiced without these specific details. For example, systems may be shown in block diagrams so as not to obscure example embodiments in unnecessary detail. In other instances, well-known processes, structures and techniques may be shown without unnecessary detail in order to avoid obscuring example embodiments.

In the following description, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware in existing electronic systems (e.g., electronic imaging systems, image processing systems, digital point-and-shoot cameras, personal digital assistants (PDAs), smartphones, tablet personal computers (PCs), laptop computers, etc.).

Such existing hardware may include one or more Central Processing Units (CPUs), digital signal processors (DSPs), application-specific-integrated-circuits (ASICs), field programmable gate arrays (FPGAs) computers or the like.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium", "computer readable storage medium" or "non-transitory computer readable storage medium" may represent one or more devices for storing data, including read only memory (ROM), random access memory (RAM), magnetic RAM, core memory, magnetic disk storage mediums, optical storage mediums, flash memory devices and/or other tangible or non-transitory machine readable mediums for storing information. The term "computer-readable medium" may include, but is not limited to, portable or fixed storage devices, optical storage devices, and various other tangible or non-transitory mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors may be programmed to perform the necessary tasks, thereby being transformed into special purpose processor(s) or computer(s).

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "includes", "including", "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which inventive concepts belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "and/or" includes any and all combinations of one or more of the associated listed items. Expressions such as "at least one of," when preceding a list of elements, modify the entire list of elements and do not modify the individual elements of the list.

Although corresponding plan views and/or perspective views of some cross-sectional view(s) may not be shown, the cross-sectional view(s) of device structures illustrated herein provide support for a plurality of device structures that extend along two different directions as would be illustrated in a plan view, and/or in three different directions as would be illustrated in a perspective view. The two different directions may or may not be orthogonal to each other. The three different directions may include a third direction that may be orthogonal to the two different directions. The plurality of device structures may be integrated in a same electronic device. For example, when a device structure (e.g., a memory cell structure or a transistor structure) is illustrated in a cross-sectional view, an electronic device may include a plurality of the device structures (e.g., memory cell structures or transistor structures), as would be illustrated by a plan view of the electronic device. The plurality of device structures may be arranged in an array and/or in a two-dimensional pattern.

Hereinafter, various example embodiments will be described more fully with reference to the accompanying drawings.

Figures 1A, 1B:
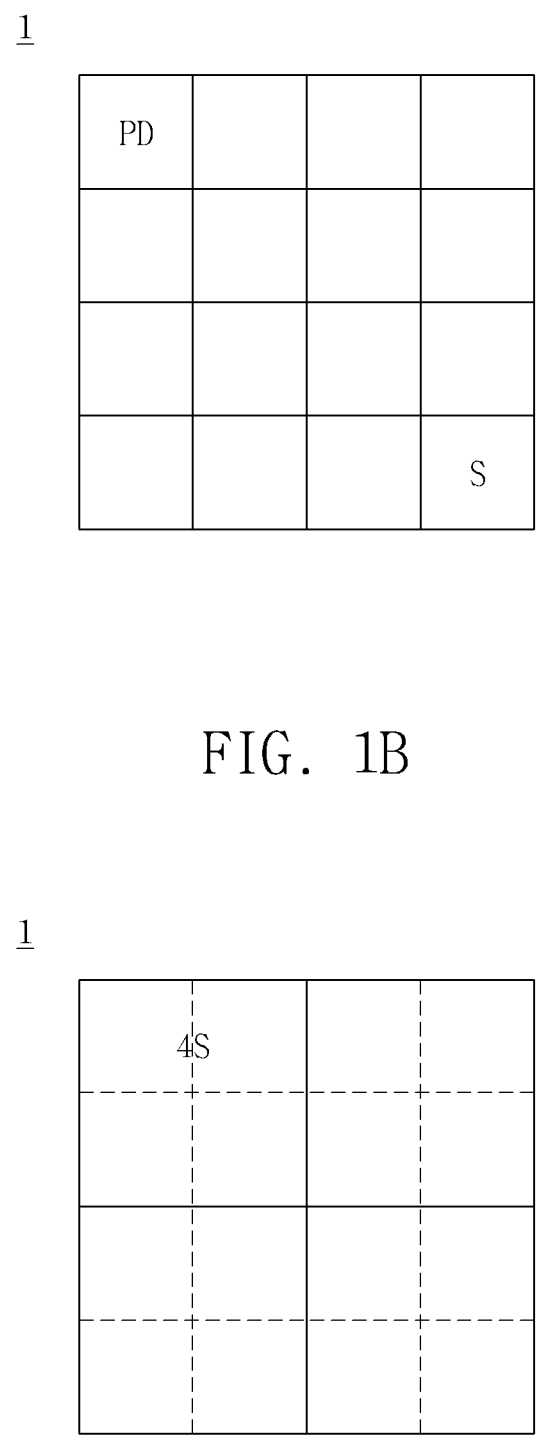

FIG. 1A is a schematic block diagram showing a pixel array 1.

The pixel array 1 includes a plurality of pixels PD arranged in the form of a row and column array. Generally, light incident to each pixel PD generates analog information.

Each pixel PD is configured to receive incident light and output a corresponding analog signal.

If the size of a pixel is at a sub-micron level, a dynamic range of the pixel is reduced due to limitations in full well capacity (FWC).

In order to overcome this problem, methods of over-sampling photoelectrically converted electrons have been proposed. These methods may be classified as a temporal sampling method and a spatial sampling method.

In a spatial sampling method, a pixel array is divided into certain unit areas S to configure a plurality of pixels PDs as shown in FIG. 1A, and output values "1" and "0" are output for a certain period of time, and the output values are added. The output values may be based on a desired (or alternatively, predetermined) threshold voltage. In this case, a 16-bit least significant bit (LSB) may be obtained, and the dynamic range may be increased by dividing the pixel array 1 into more unit areas S to increase the level of output values.

Meanwhile, FIG. 1B is a block diagram schematically showing a method of temporally sampling a pixel array 1, which has the same total area as in the FIG. 1A, in order to increase the dynamic range. Since it is difficult to configure a very small PD in the spatial sampling method, the temporal sampling method is executed by configuring a larger PD while accordingly decreasing an exposure time and reading multiple times. Since the average number of photons incident to a unit area per unit time is the same, the two methods have the same characteristics.

Referring to FIG. 1B, the pixel array 1 has a large pixel PD, for example, as large as four unit areas 4S, while the exposure time is reduced to one quarter and sampling is executed four times.

As described above, when performing over-sampling of a pixel using various methods, a binary sensor or a multi-bit sensor may be used.

FIG. 2 is a block diagram showing an image sensor 10 including a pixel using a binary sensor.

Referring to FIG. 2, the image sensor 10 includes a plurality of unit sampling circuits (or comparators) 12 and an adder (Σ) 15.

Each unit sampling circuit 12 includes a unit pixel 13 receiving photons, and a binary sensor 14.

The unit pixel 13 photoelectrically converts photons to electrons (e). The binary sensor 14 receives the electrons (e) and divides them into binary output values "1" and "0" using a reference voltage.

The adder (Σ) 15 accumulates a comparison result of each sampling circuit 12.

According to the comparison result of the binary sensor 14, the image sensor 10 may determine a dynamic range by regarding the output value "1" as being lit and the output value "0" as not being lit.

Meanwhile, an output characteristic curve of the image sensor 10 may change depending on a reference voltage value of the binary sensor 14 or the average number of electrons received during sampling, for example, the number of electrons affected by an area, an exposure time, quantum efficiency, and a conversion gain function.

Figure 3:
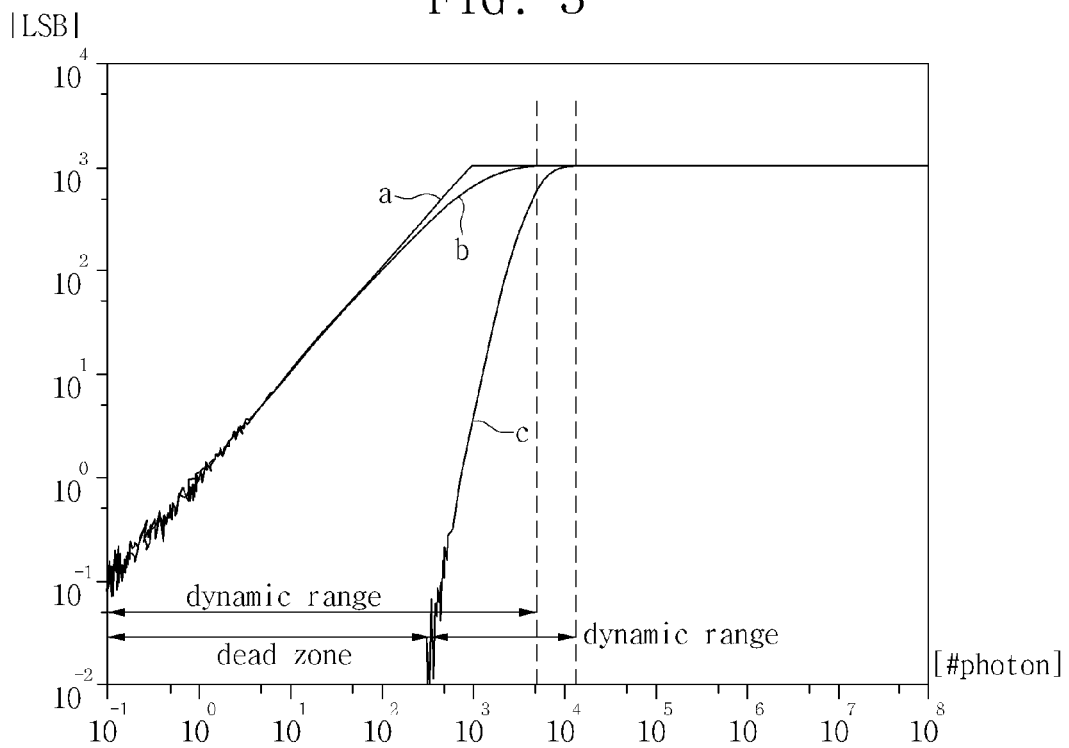
FIG. 3 is a graph showing a response characteristic curve of a binary sensor according to reference voltages.

FIG. 3 is a graph showing a response characteristic curve of a binary sensor according to reference voltages.

Referring to FIG. 3, in the response characteristic curve, the X-axis indicates the number of photons received by all pixels at a desired (or alternatively, predetermined) exposure time, and the Y-axis indicates an LSB.

The response characteristics of the binary sensor are non-linear and similar to a logarithmic function.

In the graph of FIG. 3, curve a indicates a response characteristic of an image sensor, and curve b indicates a case in which a threshold voltage of a comparator is 1e– (i.e., a threshold voltage of a single electron; the unit is electron). Curve c indicates a case in which a greater threshold voltage is required since a threshold voltage of a single electron may not be used when noise is large. In the curve c, the threshold voltage is 5e– (a threshold voltage of five electrons). In curves a-c, the threshold voltage may be determined by approximating the slope of each curve.

As shown in FIG. 3, the response characteristics are different according to the reference voltages.

In comparison with the curve a of the normal image sensor, the curve b of the binary sensor using the threshold voltage 1e– shows an increased dynamic range. However, because of actual noise, a threshold voltage greater than 1e– is used (e.g., the threshold voltage of 5e–). In this case, the curve c of the binary sensor shows that a dead zone is generated and a dynamic range is reduced.

In order to solve this problem, oversampling using a multi-bit sensor instead of the binary sensor may be used.

Figure 4:
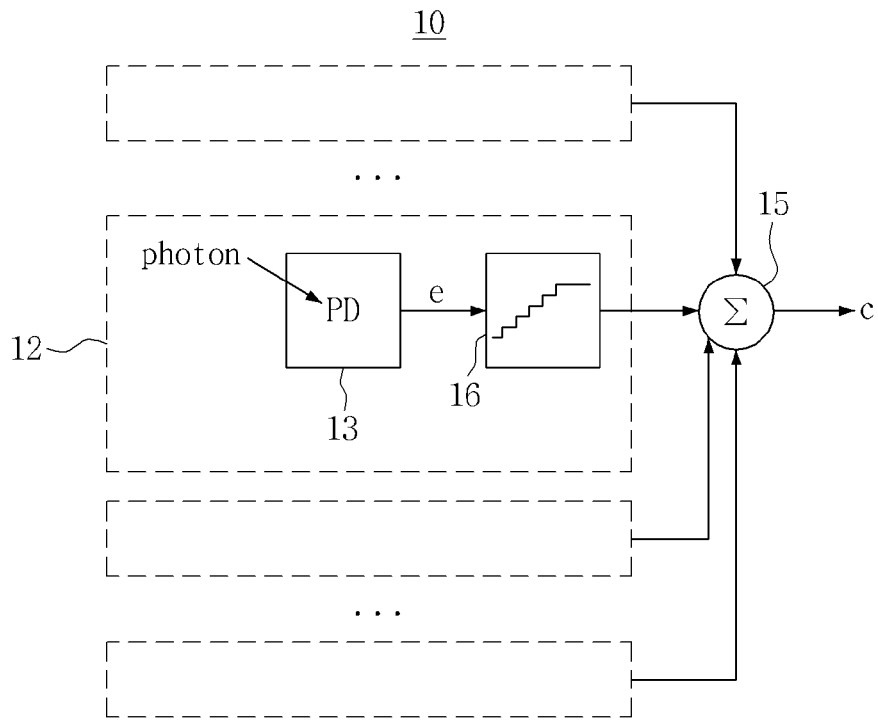
FIG. 4 is a block diagram showing an image sensor including a pixel using a multi-bit sensor.

FIG. 4 is a block diagram showing an image sensor 10 including a pixel using a multi-bit sensor.

Referring to FIG. 4, the image sensor 10 including the multi-bit sensor may include a plurality of unit sampling circuits 12 and an adder (Σ) 15.

Each unit sampling circuit 12 includes a unit pixel PD 13 receiving a photon, and an analog-to-digital converter (ADC) 16.

The unit pixel PD 13 photoelectrically converts a photon to an electron (e).

The ADC 16 reads the electron (e) in multi-bits and outputs a value greater than a saturation level as a saturation value.

The adder (Σ) 15 accumulates output values of unit sampling circuits 12 to supply an output bit c.

However, since the dead-zone phenomenon is not fully rectified at a low luminance, a conditional reset method is applied.

Furthermore, the duration of temporal over-sampling (TOS) may be changed in order to further improve the dynamic range. For this, a read-out circuit operating at a higher speed desired.

In at least one example embodiment of the inventive concepts, a read-out method is proposed that achieves fast read-out, for example, in the case of temporal over-sampling in which a multi-bit read-out technique is applied, in order to solve the limitations of FWC and ensure a wide dynamic range.

Figure 5:
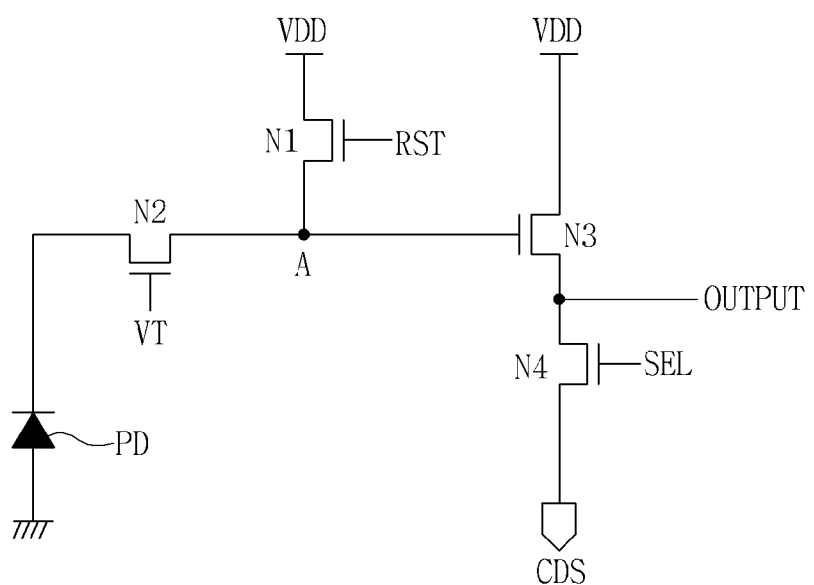
FIG. 5 is a circuit diagram of a unit pixel.

FIG. 5 is a circuit diagram of a unit pixel.

FIG. 5 is a circuit diagram of a unit pixel configuring a pixel array in an image sensor. The unit pixel may include, for example, a photo diode as a photoelectric conversion device.

Referring to FIG. 5, the unit pixel includes a photodetector PD and four transistors N1, N2, N3, and N4.

The photodetector PD photoelectrically converts incident light into the number of electrons corresponding to the amount of light. The photodetector PD may include at least one of a photo diode, a photo transistor, a photo gate, a pinned photo diode (PPD), and a combination thereof.

A transfer transistor N2 is electrically connected between the photodetector PD and an output node A which is a floating diffusion area. When a driving signal VT is applied, the transfer transistor N2 turns on and transmits a photoelectrically converted electron from the photodetector PD, which is the photoelectric conversion device, to the output node A.

A reset transistor N1 is electrically connected between a power source VDD and the output node A. The reset transistor N1 is controlled by a reset signal RST and resets a potential of the output node A at a level of the power source VDD.

The amplifying transistor N3 is electrically connected to the output node A and configures a source follower with a select transistor N4 that will be described later.

The select transistor N4 is controlled by a select signal SEL and electrically connected between a correlated double sampling (CDS) circuit and the amplifying transistor N3. When the select signal SEL is enabled, the select transistor N4 may be turned on and the potential of the output node A may be amplified by the amplifying transistor N3 to be output.

In this way, an analog voltage output from each pixel in the pixel array is converted to a digital value according to a subsequent operation and processed.

For example, the analog to digital conversion (AD conversion) may be performed by two read operations for one row.

During a first read operation, the AD conversion is performed by reading a reset level of a unit pixel. The reset level may vary in each unit pixel.

During a second read operation, the AD conversion is performed by reading an actual photoelectrically converted signal in the unit pixel. Also in this case, since variation may also exist in each unit pixel, correlated double sampling (CDS) may be performed.

In this way, a converted digital signal may be recorded in another circuit, for example, a counter latch, sequentially read by an amplifying circuit, and provided as a final output.

Figure 6:
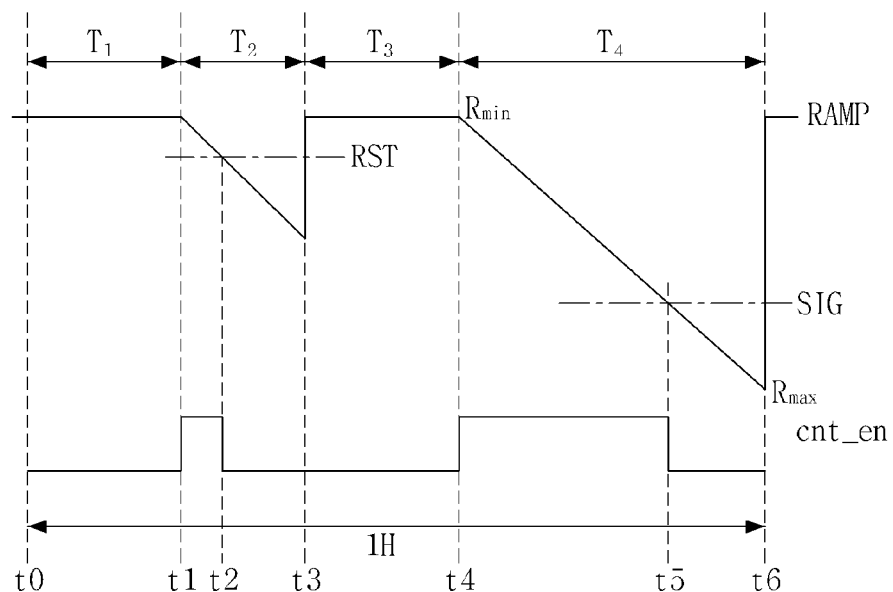
FIG. 6 is a timing diagram showing an operation of a unit pixel according to FIG. 5.

FIG. 6 is a timing diagram showing an operation of the unit pixel of FIG. 5.

Referring to FIGS. 5 and 6, during a time period t0-t1, a count-enable signal cnt_en remains disabled and a ramp signal RAMP is applied at a constant voltage.

Accordingly, during the time period t0-t1, a floating diffusion area A of a pixel is reset by the reset transistor N1, and a (variable) reset voltage is stored in the floating diffusion area A. However, during the reset operation, the reset level may be fluctuated due to noise in the reset transistor N1. This period is a voltage settling down period, that is, a start period connecting an output of the amplifying transistor N3 as a source follower to a CDS circuit. Here, the period is named phase T1.

During a time period t1-t2, the count-enable signal cnt_en is enabled by comparing the ramp signal RAMP and the reset signal RST. In response to the enabled count-enable signal cnt_en, a voltage of the ramp signal RAMP is gradually lowered with a desired (or alternatively, predetermined) slope until the time t3. Here, a reset level of the ramp signal RAMP may be detected using the preset reset signal RST. Accordingly, the time period t1-t3 is named phase T2 in which a reset level is detected. The number of clock pulses during the phase T2 (substantially the time period t1-t2) is counted.

A time period t3-t4 is a setting period for reading photoelectrically converted signals accumulated in the photodetector PD, and, more specifically, a period for storing electrons transmitted through the transfer transistor N2 in the floating diffusion area A. Here, the period is named phase T3, and referred to as a period for detecting an actual pixel signal.

During a time period t4-t5, based on the number of clock pulses counted during the phase T2, the count-enable signal cnt_en is enabled by comparing the ramp signal RAMP and a pixel output signal SIG. In response to the enabled count-enable signal cnt_en, a voltage of the ramp signal RAMP is gradually lowered according to a desired (or alternatively, predetermined) slope until the time t6. At this time, clock pulses are counted only while the ramp signal RAMP is greater than the pixel output signal SIG by comparing the ramp signal RAMP and the pixel output signal SIG. By comparing the numbers of the counted clock pulses, an actual pixel output is calculated using a CDS method. Here, the time period t4-t6 is named phase T4 for convenience of explanation.

A starting point of the phase T4 may be set as Rmin of the row signal, and an ending point of the T4 phase may be set as Rmax of the row signal.

When a signal of a selected row is output, the pixel output signal SIG may be provided as a value between the Rmin and the Rmax. In other words, a scanning range of a sampling row signal may be situated between the Rmin and the Rmax.

As described above, the total range of T1, T2, T3, and T4 are collectively referred to as a sampling period (time 1H), a pixel control time, a time for digital conversion of a pixel signal, a process of transmitting the converted signal, etc. The phases T1 to T4 proceed in the form of a pipeline.

In at least one example embodiment of the inventive concepts, a method of effectively controlling those times to reduce the sampling period (time 1H) is provided.

Figure 7:
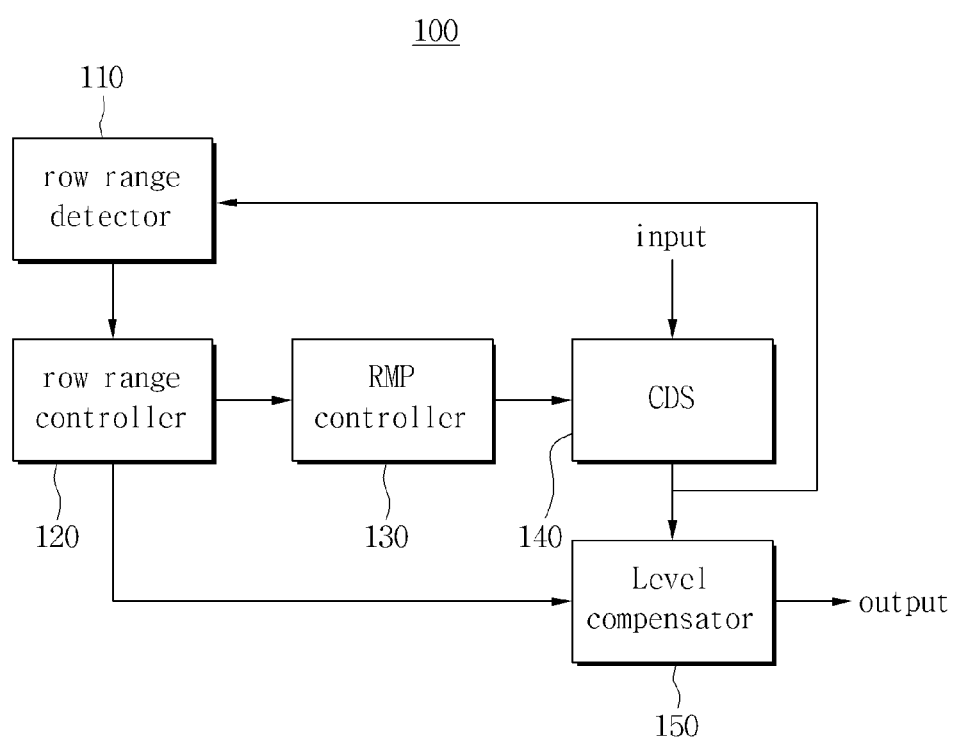
FIG. 7 is a schematic block diagram showing a sampling period control circuit in accordance with at least one example embodiment of inventive concepts.

FIG. 7 is a schematic block diagram showing a sampling period control circuit in accordance with at least one example embodiment of the inventive concepts.

Referring to FIG. 7, a sampling period control circuit 100 includes a row range detector 110, a row range controller 120, a ramp (RMP) controller 130, a CDS block 140, and a level compensator 150.

First, the row range detector 110 analyzes a row signal at a desired (or alternatively, predetermined) position to detect substantial maximum and minimum values of a row scanning range.

For example, the row range detector 110 detects an actual minimum value Rmin(k−1) and an actual maximum value Rmax(k−1) of data feedback from an arbitrarily selected $(k-1)^{th}$ column CDS (refer to CDS block 140). This may be detected in the above-described phase T4.

The row range controller 120 sets a ramp range of the next row based on Rmin and Rmax.

This may be set using the following Equation 1.

$$R_0(k) = \max(R_{min}(k-1) - \epsilon_{min}, R_{MIN})$$

$$R_1(k) = \min(R_{max}(k-1) + \epsilon_{max}, R_{MAX})$$ [Equation 1]

($\epsilon_{min}$=minimum error range, $\epsilon_{max}$=maximum error range)

That is, values obtained by considering desired (or alternatively, predetermined) error ranges on a minimum value Rmin(k−1) and maximum value Rmax(k−1) of data received from a $(k-1)^{th}$ column CDS for a previously scanned row may be set as a new scan ramp minimum value $R_0(K)$ and a new scan ramp maximum value $R_1(K)$, respectively, for a next scanned row.

The $\epsilon_{min}$ and $\epsilon_{max}$ are positive constants and may be set with a margin in a desired (or alternatively, predetermined) deviation and error range with respect to the minimum value Rmin(k−1) and the maximum value Rmax(k−1) since a range of the next row is different from a range of the present row.

More specifically, the minimum value $R_0(K)$ of a scanning range of the present row may be set as a higher value between the $R_{MIN}$ of preset ramp scanning range and the minimum value Rmin(k−1) of data received from the $(k-1)^{th}$ column CDS which is actually measured.

Likewise, the maximum value $R_1(K)$ of the scanning range of the present row may be set as a lower value between the $R_{MAX}$ value of the preset ramp scanning range and the maximum value Rmax(k−1) of data received from the $(k-1)^{th}$ column CDS which is actually measured.

Consequently, the new $R_0(K)$ and $R_1(K)$ may be set as a changed scanning range of a ramp voltage derived by analyzing the previous row signal. Accordingly, the scanning range of the ramp voltage may be less than that of the previous row.

This is an example of when scanning is performed in a range of a single row. When $R_0(K)$ and $R_1(K)$ are set as accumulated values by selecting a plurality of rows in order to reduce an error range, ranges of $R_{min}$ and $R_{max}$ may be derived using the following Equation 2.

$$R_{min}(k-1) = f(R_{min}(k-1), R_{min}(k-2), \ldots)$$

$$R_{max}(k-1) = f(R_{max}(k-1), R_{max}(k-2), \ldots)$$ [Equation 2]

That is, a plurality of values are calculated, and then $R_{MIN}$ and $R_{MAX}$ are set using extrapolation. Likewise, $\epsilon_{min}$ and $\epsilon_{max}$ may also use estimated next row values using a plurality of previous values.

This is an extended example embodiment showing that a plurality of information may be used in order to increase the accuracy of a scanning range, however, the scope of the inventive concepts is not limited thereto.

The RMP controller 130 is a ramp controller and may control a comparison operation of a ramp signal.

In at least one example embodiment of the inventive concepts, the RMP controller 130 may control an operation in which a ramp range of a row signal is compared, and an operation in which a ramp voltage is scanned using newly set $R_0$ and $R_1$ and compared.

The CDS 140 is a circuit performing CDS sampling.

When receiving an input, the CDS 140 may perform a CDS operation under control of the RMP controller 130.

The level compensator 150 may add a count value read from each column to an original value in response to outputs of the row range controller 120 and the CDS 140. The count values may correspond to a number of counted clock pulses.

Figure 8:
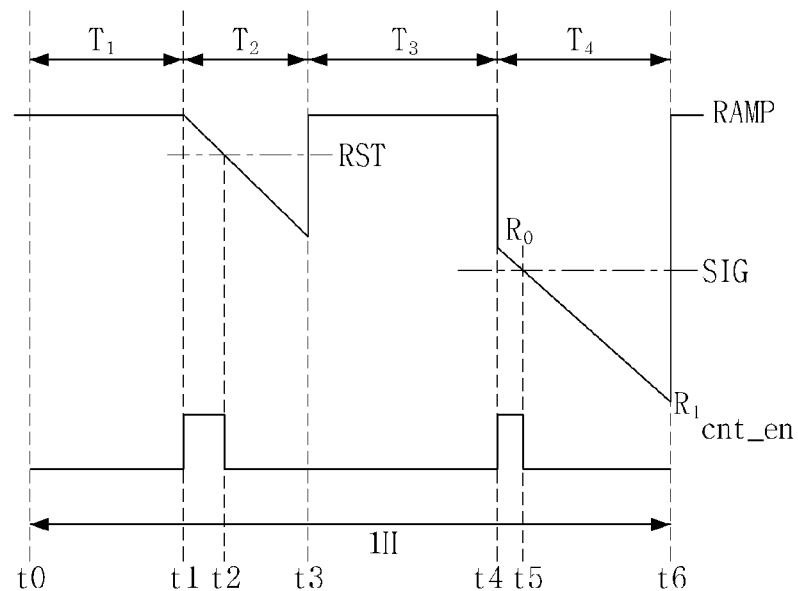
FIG. 8 is a timing diagram showing an operation according to FIG. 7.

To describe in more detail, the level compensator 150 may adjust the number of counts X0(h) read from each column by adding the number of counts from t4-t5 in FIG. 6 to the number of counts from t4-t5 in FIG. 8 to obtain an adjusted number of counts x(h). The level compensator 150 may use the following Equation 3.

$$X(h) = XR_0 + X0(h) \quad \text{[Equation 3]}$$

($XR_0$ is the number of count for $R_0$)

As an example, when a ramp voltage is scanned using $R_0$ and $R_1$ newly set according to at least one example embodiment of the inventive concepts, a difference in the number of counts may be generated since the newly-set ramp voltage scanning range is narrower than an original ramp voltage scanning range. In order to mitigate (or alternatively, prevent) an error in the number of counts occurring during a subsequent signal restoring process, the number of counts may be adjusted by adding the number of counts from t4-t5 in FIG. 6 to the number of counts from t4-t5 in FIG. 8.

For ease of description, assume that 55 clock pulses are counted during the phase T4 in the original ramp voltage scanning range (e.g., in FIG. 6), and five clock pulses are counted during the phase T4 according to at least one example embodiment of the inventive concepts (e.g., in FIG. 8). During a subsequent signal restoring process, since the clock pulses are counted not from 0V but from a newly-set voltage $R_0$, a voltage difference depending on a difference in the number of clock pulses may occur. Accordingly, in order to mitigate (or alternatively, prevent) the error, the number of counted clock pulses in FIG. 8 is added to the number of counted clock pulses in FIG. 6 and the result (e.g., 60 clock pulses) is stored in a latch.

According to at least one example embodiment of the inventive concepts, and it is obvious that a circuit with the above described features may be embodied in different forms within the scope of the inventive concepts by those skilled in the art. For example, the reduced number of counts may be converted into voltage terms as a restored voltage. These example embodiments are provided in order to describe the disclosure in more detail, and the scope of the inventive concepts is not limited thereby.

Next, FIG. 8 is a timing diagram showing an operation according to FIG. 7.

Referring to FIGS. 6, 7, and 8, during the time period t0-t1, the count-enable signal cnt_en remains disabled, and the ramp signal RAMP is maintained at a constant voltage and input.

During the time period t1-t2, the count-enable signal cnt_en is enabled by comparing the ramp signal RAMP and the reset signal RST. In response to the enabled count-enable signal cnt_en, a voltage of the ramp signal RAMP is gradually lowered until the time t3. At this time, a reset level of the ramp signal RAMP may be detected by the preset reset signal RST.

The time period t3-t4 is a setting period for reading an electrically converted signal accumulated in the photodetector PD, and more specifically, a period for storing electrons transmitted through the transfer transistor N2 in the floating diffusion area A.

During the time period t4-t5, the count-enable signal cnt_en is enabled by comparing the ramp signal RAMP and the pixel output signal SIG on the basis of the number of clock pulses counted in the phase T2. In response to the enabled count-enable signal cnt_en, a voltage of the ramp signal RAMP is gradually lowered according to a desired (or alternatively, predetermined) slope until the time t6. Here, the clock pulses are counted only while the ramp signal RAMP is greater than the pixel output signal SIG by comparing the ramp signal RAMP and the pixel output signal SIG. By comparing the numbers of the counted clock pulses, an actual pixel output is calculated using a CDS method.

A starting point of the phase T4 may be set as Rmin, and an ending point of the phase T4 may be set as Rmax.

When a signal of a selected row is output, a value between $R_{MIN}$ and $R_{MAX}$ may be provided as the pixel output signal SIG. In other words, a scanning range of a sampling signal lies between $R_{MIN}$ and $R_{MAX}$. At this time, Rmin and Rmax of an actual pixel output signal SIG are detected by the row range detector 110.

Next, when the next row signal is read, as shown in FIG. 8, values obtained by considering a desired (or alternatively, predetermined) error range on the minimum value Rmin(k−1) and maximum value Rmax(k−1) based on data received from the (k−1)$^{th}$ column CDS may be set as new $R_0$ and $R_1$ using the method in Equation 2 and the detected Rmin and Rmax.

Accordingly, when the next row signal is read, although operations in the phases T1 to T3 of FIG. 8 are performed in the same way as in FIG. 7, operations may be controlled to read the present pixel signal in a reduced period as shown in FIG. 8 since $R_0$ and $R_1$ in the phase T4 has been newly set.

In accordance with at least one example embodiment of the inventive concepts, $R_0$ and $R_1$, which are new bases for resetting a ramp range of a pixel signal of the present pixel are detected by analyzing the previous row signal and applied, and thereby 1H time may be reduced.

Accordingly, since more sampling is available within a given period of time during a multi-sampling operation, more precise data may be obtained and pixel quality may be improved.

Another example embodiment of the inventive concepts will be described hereinafter.

Whereas the overall time 1H is reduced by reducing the time of the phase T4 in accordance with the above described example embodiments of the inventive concepts, hereinafter, it will be described how the phase T4 is reduced and the reduced time is compensated for in the phases T1 and T3.

Figure 9:
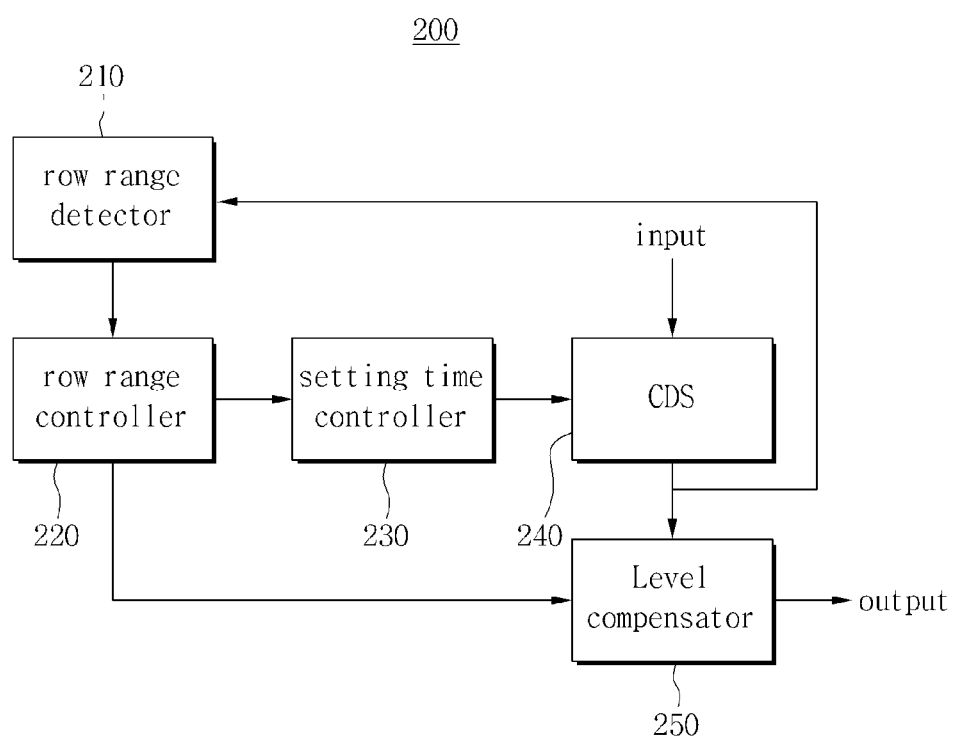
FIG. 9 is a block diagram showing a sampling period control circuit in accordance with at least one example embodiment of inventive concepts.

FIG. 9 is a block diagram showing a sampling period control circuit in accordance with at least one example embodiment of the inventive concepts.

Referring to FIG. 9, the sampling period control circuit 200 includes a row range detector 210, a row range controller 220, a setting time controller 230, a CDS 240, and a level compensator 250.

In FIG. 9, circuits having similar functions and operations to that in FIG. 7 will be described briefly, to avoid duplication of description.

First, the row range detector 210 detects a maximum value and a minimum value by analyzing a row signal at a desired (or alternatively, predetermined) position.

For example, a minimum value Rmin(k−1) and a maximum value Rmax(k−1) of data received from an arbitrarily selected $(k-1)^{th}$ column CDS are detected. This may be detected in the above-described phase T4.

The row range controller 220 set a ramp range of the next row.

This may be set using the above-described Equation 1.

That is, values obtained by considering desired (or alternatively, predetermined) error ranges on a minimum value Rmin(k−1) and a maximum value Rmax(k−1) based on data received from the $(k-1)^{th}$ column CDS may be set as new $R_0$ and $R_1$, respectively.

Here, since a range of the next row is different from a range of the present row, the new $R_0$ and $R_1$ may be set with a desired (or alternatively, predetermined) margin of a deviation and error range ($\epsilon_{min}$ and $\epsilon_{max}$ are positive constants).

Therefore, the new $R_0$ and $R_1$ may be set as a changed scanning range of a ramp voltage derived from an analysis of the previous row signal. Accordingly, the scanning range of the ramp voltage may be reduced compared to when analyzing the previous row.

This is an example of when scanning a range of a single row. Therefore, in order to set $R_0$ and $R_1$ with accumulated values obtained by selecting a plurality of rows, the ranges of $R_{min}$ and $R_{max}$ may be extracted using the aforementioned Equation 2.

As described above, in this case, $R_{MIN}$ and $R_{MAX}$ may be set by calculating a plurality of values and using extrapolation. Likewise, estimated next row values using the plurality of previous values may be used as $\epsilon_{min}$ and $\epsilon_{max}$.

The setting time controller 230 in accordance with at least one example embodiment of the inventive concepts is a kind of timing controller and may include a state machine which controls progress to a next state when each of the phases T1 to T4 satisfies the preset number of clocks as a clock base.

Consequently, in accordance with at least one example embodiment of the inventive concepts, when the number of clocks in the phase T4 is reduced to within a desired (or alternatively, predetermined) number of clocks, the difference between the preset number of clocks and the reduced number of clocks may be compensated for in another setting time.

For example, when a preset phase T4 is set as 400 clock counts and a scanning voltage range of the phase T4 is reduced to 200 clock counts by extracting a new scanning range, 200 clock counts corresponding to a difference between the preset 400 clock counts and the newly-set 200 clock counts may be compensated for in another phase.

The compensation of clock counts for the other phase is for achieving a stable operation by compensating for additional time in a phase in which a longer setting time is required. This is because, when an RC time constant related to a physical parasitic resistance and a parasitic capacitance is already determined, a stabilization time for an operation may be insufficient depending on the RC time constant. In such cases, a sampling operation of an image sensor may be more reliable by compensating for the additional time in a phase in which the stabilization time is insufficient.

The CDS 240 is a circuit that performs a CDS sampling.

When receiving an input, the CDS 240 may perform the CDS sampling operation under control of the RMP controller 130.

The level compensator 250 may add a counted value read in each column to an original value in response to outputs of the row range controller 220 and the CDS 240.

The level compensator 250 may add the counted value read by each column to the original value using the above-described Equation 3.

Figure 10:
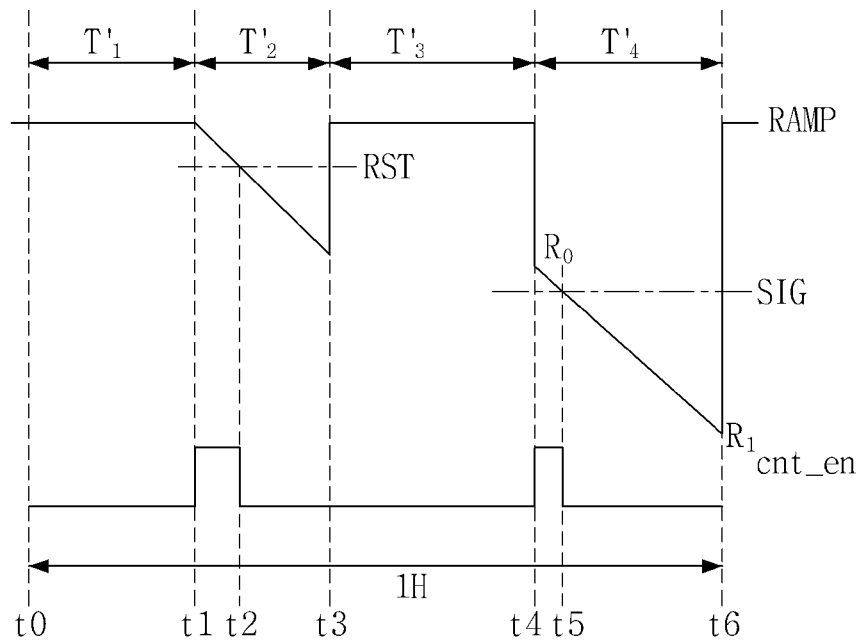
FIG. 10 is a timing diagram showing an operation according to FIG. 9.

FIG. 10 is a timing diagram showing an operation according to FIG. 9.

Referring to FIGS. 9 and 10, during the time period t0-t1, the count-enable signal cnt_en is disabled, and the ramp signal RAMP is maintained at a constant voltage and input.

As described above, since the number of clocks in the phase T4 is reduced as much as the scanning voltage range is reduced in the phase T4, the difference between the preset number of clocks and the newly-set number of clocks may be compensated for in another phase (e.g., phases T1, T2, and/or T3). Here, the reduced time in the phase T4 is compensated for in the phases T1 and T3, for example.

Phases T1' to T4' are introduced to describe each of the phases T1 to T4 as a new concept of time.

Accordingly, when the next row signal is read, it may be understood that a new phase T1' is increased from the previous phase T1.

Likewise, it may be understood that a new phase T3' is increased from the previous phase T3.

The following Equation 4 may be established on the basis of the number of clocks.

$$T4'=T4-\Delta T4$$

$$\Delta T4=\Delta T1+\Delta T2$$

$$T1'=T1+\Delta T1$$

$$T3'=T3+\Delta T2 \quad [\text{Equation 4}]$$

($\Delta T4$ is a reduced time in the phase T4, $\Delta T1$ is a compensation time for the phase T1, and $\Delta T2$ is a compensation time for the phase T3)

In the phase T2', which is the same as the time period t1-t2, the count-enable signal cnt_en is enabled by comparing the ramp signal RAMP and the reset signal RST. In response to the enabled count-enable signal cnt_en, a voltage of the ramp signal RAMP is gradually dropped until the time t3. At this time, a reset level of the ramp signal RAMP may be detected by the preset reset signal RST.

The phase T3' is a setting period for reading photoelectrically converted signals accumulated in the photodetector PD and stores electrons transmitted by the transfer transistors N2 in the floating diffusion area A. The phase T3' may be implemented to be fully stabilized by adding $\Delta T2$ the previous period T3.

During the time period t4-t5, the count-enable signal cnt_en is enabled by comparing the ramp signal RAMP and the pixel output signal SIG on the basis of the counted number of clock pulses. By comparing the counted number of clock pulses during the period in which the count-enable signal cnt_en is enabled, an actual pixel output is calculated using a CDS method.

In the phase T4', values obtained by considering desired (or alternatively, predetermined) error rates on the minimum value Rmin(k−1) and the maximum value Rmax(k−1) based on data received from the $(k-1)^{th}$ column CDS may be set as a new $R_{MIN}$ and $R_{MAX}$ using the above-described Equation 1 as described in FIG. 9.

In addition, according to at least one example embodiment of the inventive concepts, the reduced time in the phase T4' may be secured by detecting and applying $R_{MIN}$ and $R_{MAX}$ which are new bases for resetting a range of the pixel signal of the present pixel by analyzing the previous row signal.

The secured time in the phase T4' is applied to the phases T1' and T3' to ensure a setting time and achieve a stable operation in the phases T1' and T3'. Thus, during a multi-sampling operation, a stable sampling operation within a given period of time is supported and quality of pixels may be improved.

Figure 11:
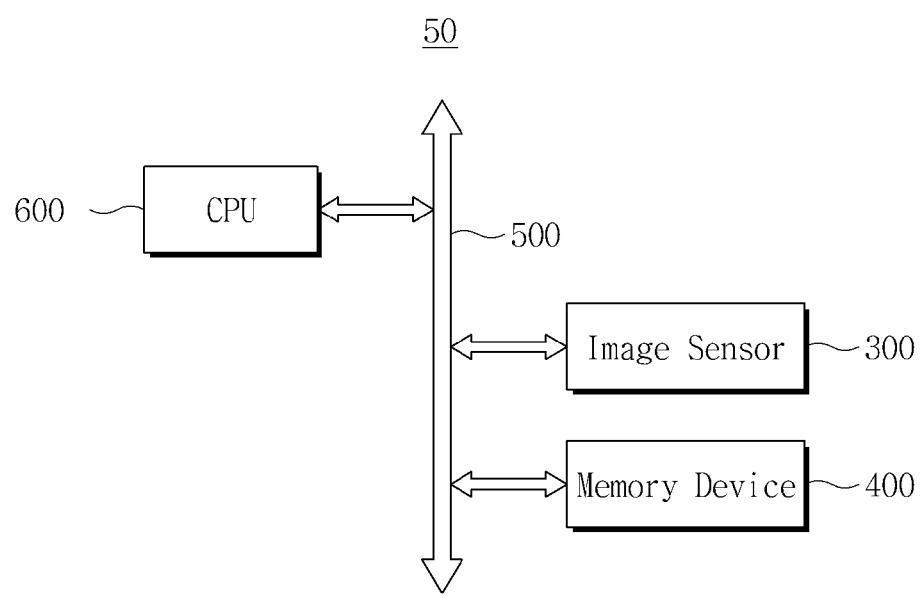
FIG. 11 is a schematic block diagram of a semiconductor system including an image sensor in accordance with at least one example embodiment of inventive concepts.

FIG. 11 is a schematic block diagram of a semiconductor system 50 including an image sensor 300 in accordance with at least one example embodiment of the inventive concepts.

Referring to FIG. 11, the semiconductor system 50 may include an image sensor 300, a memory device 400, a bus 500, and a CPU 600.

Here, the semiconductor system 50 may include a computer system, a camera system, a scanner, a navigation system, a video phone, a supervision system, an automatic focus system, a tracing system, an operation monitoring system, an image stabilization system, etc.

The CPU 600 may transmit and receive data through the bus 500, and control an operation of the image sensor 300.

The memory device 400 may receive an image signal output from the image sensor 300 through the bus 500 and store the video signal.

Although a schematic configuration of the semiconductor system 50 is exemplarily described here, an I/O interface, a digital signal processor (DSP), etc. which may communicate with an external apparatus may be further included.

The sampling period controlling circuit in accordance with at least one example embodiment of the inventive concepts may be applied to a memory device, and in particular, an image sensor and a memory system including thereof.

The sampling period control circuit in accordance with at least one example embodiment of the inventive concepts may reduce a sampling period by resetting a ramping range of the present pixel signal based on an analysis of the previous row signal. Accordingly, since more sampling may be available within a given period of time during a multi-sampling operation, more precise data can be obtained and quality of pixels can be improved.

The foregoing is illustrative of example embodiments and is not to be construed as limiting thereof. Although a few example embodiments have been described, those skilled in the art will readily appreciate that many modifications are possible without materially departing from the novel teachings and advantages. Accordingly, all such modifications are intended to be included within the scope of the inventive concepts as defined in the claims.

What is claimed is:

1. A sampling period control circuit configured to derive a ramp voltage range of a row signal when analyzing a previous row signal in order to control a ramp voltage range of a next row signal, the sampling period control circuit comprising:
   a row range detector configured to detect a substantial maximum value and minimum value of a row scanning range by analyzing the previous row signal;
   a row range controller configured to reset a scan ramp maximum value and a scan ramp minimum value based on an error range in the detected substantial maximum value and minimum value of the row scanning range;
   a ramp controller configured to control scanning and comparing a ramp voltage of a corresponding row using the scan ramp maximum value and the scan ramp minimum value; and
   a correlated double sampling (CDS) circuit configured to perform a CDS operation on a result of the comparison received from the ramp controller,
   wherein the row range detector is configured to detect the substantial maximum value and minimum value of the row scanning range from data fed back from the CDS circuit, the data relating to the previous row signal.

2. The sampling period control circuit of claim 1, wherein the row range controller is configured to select a higher value between a minimum value of a preset ramp scanning range and a minimum value of a scanning range measured in the previous row signal as the scan ramp minimum value.

3. The sampling period control circuit of claim 1, wherein the row range controller is configured to select a lower value between a maximum value of the preset ramp scanning range and a maximum value of a scanning range measured in the previous row signal as the scan ramp maximum value.

4. The sampling period control circuit of claim 2, wherein the row range controller is configured to deduct the error range to obtain the scan ramp minimum value.

5. The sampling period control circuit of claim 3, wherein the row range controller is configured to add the error range to obtain the scan ramp maximum value.

6. The sampling period control circuit of claim 1, further comprising:
   a level compensator configured to adjust a count value read from each column in response to an output of the row range controller and the CDS circuit based on an original count value.

7. A sampling period control circuit configured to control a ramp voltage scanning range and a sampling period of a previous row signal to be different from a ramp voltage scanning range and a sampling period of a next row signal, the sampling period control circuit comprising:
   a row range detector configured to detect a substantial maximum value and minimum value of a row scanning range by analyzing the previous row signal;
   a row range controller configured to reset a scan ramp maximum value and a scan ramp minimum value based on an error range in the substantial maximum value and minimum value of the row scanning range;
   a ramp controller configured to control scanning and comparing a ramp voltage of a corresponding row by using the scan ramp maximum value and the scan ramp minimum value; and
   a correlated double sampling (CDS) circuit configured to perform a CDS operation on a result of comparison received from the ramp controller,
   wherein the row range detector is configured to detect the substantial maximum value and minimum value of the row scanning range from data fed back from the CDS circuit, the data relating to the previous row signal.

8. The sampling period control circuit of claim 7, wherein the row range controller is configured to select a higher value between a minimum value of a preset ramp scanning range and a minimum value of a scanning range measured in the previous row signal as the scan ramp minimum value.

9. The sampling period control circuit of claim 7, wherein the row range controller is configured to select a lower value between a maximum value of the preset ramp scanning range and a maximum value of a scanning range measured in the previous row signal as the scan ramp maximum value.

10. The sampling period control circuit of claim 7, wherein the ramp voltage scanning range of the next row signal is reduced compared to the ramp voltage scanning range of the previous row signal.

11. The sampling period control circuit of claim 10, wherein the sampling period of the next row signal is shorter than the sampling period of the previous row signal.

12. A device, comprising:
   a sampling period control circuit configured to,
      measure a voltage range of a first scan signal, and adjust a voltage range of a second scan signal based on the measured voltage range and an error range associated with the measured voltage range of the first scan signal, the second scan signal being subsequent to the first scan signal.

13. The device of claim 12, wherein the sampling period control circuit is configured to perform a sampling operation using the second scan signal having the adjusted voltage range.

14. The sampling period control circuit of claim 12, wherein the sampling period control circuit is configured to select a higher value between a minimum value of a preset voltage range and a minimum value of the measured voltage range as a minimum value of the adjusted voltage range.

15. The sampling period control circuit of claim 12, wherein the sampling period control circuit is configured to select a lower value between a maximum value of a preset voltage range and a maximum value of the measured voltage range as a maximum value of the adjusted voltage range.

* * * * *